(12) United States Patent
Verhaegh

(10) Patent No.: US 9,398,173 B2
(45) Date of Patent: Jul. 19, 2016

(54) TWO-DIMENSIONAL CALIBRATION OF IMAGE SENSOR ALIGNMENT IN OPTICAL SCANNERS

(75) Inventor: Gerard Verhaegh, Hillerød (DK)

(73) Assignee: CONTEX A/S, Allerod (DK)

( * ) Notice: Subject to any disclaimer, the term of this patent is extended or adjusted under 35 U.S.C. 154(b) by 0 days.

(21) Appl. No.: 13/877,327

(22) PCT Filed: Oct. 1, 2010

(86) PCT No.: PCT/EP2010/064654
§ 371 (c)(1),
(2), (4) Date: Jun. 10, 2013

(87) PCT Pub. No.: WO2012/041389
PCT Pub. Date: Apr. 5, 2012

(65) Prior Publication Data
US 2013/0250371 A1  Sep. 26, 2013

(51) Int. Cl.
*H04N 1/00* (2006.01)
*H04N 1/19* (2006.01)
*H04N 1/387* (2006.01)
(Continued)

(52) U.S. Cl.
CPC ............ *H04N 1/00031* (2013.01); *H04N 1/19* (2013.01); *H04N 1/1903* (2013.01); *H04N 1/1934* (2013.01); *H04N 1/19584* (2013.01);
(Continued)

(58) Field of Classification Search
CPC .......... H04N 1/00031; H04N 1/19584; H04N 1/1903; H04N 1/19; H04N 1/3876; H04N 1/1934; H04N 1/195; H04N 1/193
See application file for complete search history.

(56) References Cited

U.S. PATENT DOCUMENTS

| 5,982,951 A * | 11/1999 | Katayama | H04N 1/3876 348/584 |
| 6,373,995 B1 * | 4/2002 | Moore | G06K 9/20 345/629 |

(Continued)

FOREIGN PATENT DOCUMENTS

| JP | 6-152871 A | 5/1994 |
| JP | 2003-83908 A | 3/2003 |

OTHER PUBLICATIONS

International Search Report received for PCT Patent Application No. PCT/EP2010/064654, mailed on Jun. 21, 2011, 3 pages.
(Continued)

*Primary Examiner* — King poon
*Assistant Examiner* — Andrew H Lam
(74) *Attorney, Agent, or Firm* — Morrison & Foerster LLP

(57) ABSTRACT

Disclosed is a method of processing image signals from a first and a second image sensor, both of a document scanner unit, where the first image sensor provides a first image, and the second image sensor provides a second image. The first and the second image are two-dimensional images wherein said first and second image are recorded at respective areas of a scanned medium, where a portion of the respective areas is recorded also by the other of the respective image sensors. Thereby image data from overlapping and non-overlapping areas are present in the first and the second image. The method comprises: correlating the first image with the second image, creating a correlation image and processing the correlation image to determine a displacement between the first and the second image. Consequently, a versatile calibration method is provided that can determine a displacement between the first and the second image in two dimensions.

13 Claims, 7 Drawing Sheets

(51) Int. Cl.
*H04N 1/193* (2006.01)
*H04N 1/195* (2006.01)

(52) U.S. Cl.
CPC .............. *H04N1/3876* (2013.01); *H04N 1/193* (2013.01); *H04N 1/195* (2013.01)

(56) References Cited

U.S. PATENT DOCUMENTS

| | | |
|---|---|---|
| 6,396,960 B1 | 5/2002 | Yoshimura |
| 2004/0146218 A1 | 7/2004 | Tinn et al. |
| 2006/0050951 A1* | 3/2006 | Iwasaki .............. H04N 1/1934 382/151 |
| 2010/0118343 A1 | 5/2010 | Migishima |

OTHER PUBLICATIONS

International Preliminary Report on Patentability received for PCT Patent Application No. PCT/EP2010/064654, completed on Sep. 11, 2012, 8 pages.

Office Action Received for Japanese Patent Application No. 2013-530588, mailed on May 8, 2014, 6 pages (3 pages of English Translation and 3 pages of Official Copy).

* cited by examiner

TWO-DIMENSIONAL CALIBRATION OF IMAGE SENSOR ALIGNMENT IN OPTICAL SCANNERS

CROSS REFERENCE TO RELATED APPLICATION

This application is a U.S. National Phase patent application of PCT/EP2010/064654, filed Oct. 1, 2010, which is hereby incorporated by reference in the present disclosure in its entirety.

FIELD

This invention generally relates to optical scanning of an object. More particularly the invention relates to optical scanning of large documents by optical scanners, comprising a plurality of image sensors and to calibration of such optical scanners.

BACKGROUND

Scanning of large objects, e.g. large maps or technical drawings, is conventionally performed by use of a plurality of image sensors as it is a difficult and expensive task to manufacture large single image sensors. Examples of image sensors are charge coupled devices (CCD) or contact image sensors (CIS). The image sensors are typically arranged on a movable fixture, moving past a medium to be scanned, or the medium is pulled past the fixture by motor-operated rolls. The precise position of the image sensors may be determined by appropriate calibration procedures after the manufacture of a scanner. However, due to stress induced on the scanner during transportation and/or use, small movements of the image sensors on the fixture and/or small uncertainties in the motor operating the rolls or fixture may result in artefacts in the scanned images.

U.S. Pat. No. 7,298,921 discloses a document scanning method that comprises: causing relative movement between a document and first and second imaging elements, such that each of a succession of scan lines of the document is exposed in turn to the imaging elements; generating first and second image data words representative of overlapping portions of each scan line; and concatenating at least a portion of the words to generate a third word representative of the scan line, the method being characterised by the steps of cross-correlating at least a portion of each of the words to identify a portion of the second word that is included in the first word; discarding a portion of at least one of the words; concatenating the first word or the remainder thereof with the second word or the remainder thereof to form the third word; and, if necessary, compressing or expanding the third word by linear interpolation so as to obtain a word of a predetermined length. The method, however, has limited abilities to compensate for variation between image sensors, making manual calibration and/or adjustment of the positioning of the image sensors necessary.

Thus, it remains a problem to provide a versatile method for calibrating large format scanners.

SUMMARY

According to a first aspect, there is provided a method of processing image signals from a first and a second image sensor, both of a document scanner unit, where said first image sensor provides a first image, and said second image sensor provides a second image, said first and second image being two dimensional images, wherein said first and second image are recorded at respective areas of a scanned medium, where a portion of the respective areas is recorded also by the other of the respective image sensors, whereby image data from overlapping and non-overlapping areas are present in the first and the second image; the method comprising:

correlating said first image with said second image creating a correlation image and processing said correlation image to determine a displacement between said first and second image.

Consequently, a versatile calibration method is provided that can determine a displacement between the first and the second image in two dimensions resulting from a two dimensional displacement of the image sensors and/or the motor speed of the motor operating the rolls and/or fixture. This will allow large format scanners to be calibrated during normal scanning, without the need for complicated separate manual calibration procedures.

In some embodiments, the determined displacement between the first and the second image is processed together with the used optical resolution of the image sensors to determine the relative position of the first and the second image sensor and/or the motor speed of the motor operating the rolls and/or fixture of the scanner.

The method may be a method of processing signals from a large-format scanner comprising a first and a second image sensor. The image sensor may comprise image sensor elements arranged in an array, e.g. a linear array. The image sensor may comprise two staggered linear arrays of image sensor elements, e.g. two 600 dpi arrays staggered to create a 1200 dpi image sensor. Any kind of image sensors suitable for optical scanning may be used, such as any kind of photo voltaic sensor e.g. a contact image sensor (CIS) or a charge coupled device (CCD) camera. A suitable lighting device may be arranged together with the image sensors such as a xenon-based lighting device, a cold cathode fluorescent lamp or an LED lighting device. The image sensors may comprise a plurality of different image sensor elements configured to detect light having different wave lengths; e.g. a first image sensor element may be configured to detect red light, a second image sensor element may be configured to detect green light, and a third image sensor element may be configured to detect blue light. Alternatively or additionally, the lighting devices may be configured to illuminate the physical object to be scanned with light having different wave lengths, e.g. the lighting devices may be configured to create red, green, and blue light.

The image sensors may be arranged in any fashion as long as a common area of a scanned medium is recorded by at least two image sensors. The image sensors may be arranged on a movable structure, and/or a physical medium may be moved past the image sensors so that a completely scanned image of the physical medium may be formed. The common area may be recorded by the image sensors at different points in time; e.g. the image sensors may be arranged on two parallel lines, where every other image sensor is arranged with a field of view on a first line, and the image sensors in-between are arranged with a field of view on a second line, where the distance between the field of view of two adjacent image sensors on a line is below the width of the field of view of the image sensors, such that an area of a scanned medium recorded by an image sensor on the first line is also recorded by an image sensor on the second line, at a different point in time; e.g. when the image sensors and/or the physical medium are/is moved, as described in relation to FIG. 2.

In some situations, the precision of the above-described method may be insufficient. This may result in erroneous estimate of the displacement between the first and the second image with the effect that the scanner may be miscalibrated. This may create artefacts in the scanned images.

In some embodiments, the method further comprises the step of:
- selecting a first sub image at a location in the overlapping area of the first image, and a second sub image at a location in the overlapping area of the second image, wherein the first and the second sub images both comprise image data from the same area of the scanned medium;
- correlating said first sub image with said second sub image creating a first correlation image indicative of correlations at various displacement between said first and second sub images;
wherein, the method further comprises repeating the above steps with sub images taken from different location than the first and the second sub image, thus creating a second correlation image, and determining a displacement between the first and the second image resulting from a physical displacement between the first and the second image sensor, by processing the first and the second correlation image.

Consequently, a precise method of calibrating a large format scanner is provided. By using smaller sub images, the effect of de-correlation, resulting from in-scan changes in the position of the image sensors and/or variations in the motor speed of the motor displacing the image sensors relative to the physical medium, can be lowered. This will result in a more precise calibration of the scanner, allowing the scanner to generate higher quality images.

The sub-images are smaller than the first and the second image. The sub image may have any shape such as square, rectangular, circular etc. The first and the second sub image may have the same size or they may have different sizes, e.g. the second sub image may be smaller than the first sub image or the first sub image may be smaller than the second sub image. The sub images may be correlated using any algorithm capable of examining the correlation between two two-dimensional images such as the two dimensional cross-correlation, a sum of absolute difference operator, or sum of squared difference operator. The correlation algorithm may only correlate a part of the sub images with each other e.g. the first and the second sub image may be correlated with each other at e.g. +−2,5,10,20,30,50,100,200 pixels in the x and/or the y direction. The correlation algorithm may correlate more in one direction than in another e.g. 10 pixels in the x directions and 30 pixels in the y direction. Thereby the computational requirements of the correlations may be lowered. The correlation images represent the correlation between the correlated sub images at various respective displacements. The sub images may have their DC value subtracted before they are correlated.

In some embodiments, the method comprises selecting a third sub image from the overlapping area of the first image, and a fourth sub image from the overlapping area of the second image, wherein the third and the fourth sub images both comprise image data from the same area of the scanned medium;
- correlating said third sub image with said fourth sub image creating a second correlation image indicative of correlations at various displacement between said third and fourth sub images;
- determining a displacement between the first and the second image, by processing the first and the second correlation image.

A part of the sub images may overlap, e.g. the first and third sub images may partly overlap and a part of the second and fourth sub images may partly overlap e.g. the first and third sub images may differ only with respect to a single line. More than two sub images from each of the first and the second image may be used e.g. 3, 4, 5, 10, 20, 30, 50, 100, 200, 500 or more sub images from each of the first and the second image, resulting in 3, 4, 5, 10, 20, 30, 50, 100, 200, 500 or more correlation images.

In some embodiments, two consecutive sub images in either the first or the second image differ with at least 2, 3, 4 or 5 lines, e.g. the first and the third sub image may differ with at least 2, 3, 4, or 5 lines. By using fewer sub images, the computational requirements of the method may be lowered.

The first and the second correlation image may be processed together using any algorithm taking the first and the second correlation image as an input. The first and the second correlation image may be processed by adding the first correlation image with the second correlation image creating a combined correlation image. The processing may further include identifying the pixel in the first, the second or combined correlation image representing the highest correlation. The peak corresponds to the relative displacement between the sub images e.g. between the first and the second sub image, where the correlation is highest e.g. where the sub images are most alike. The first and the second correlation image and/or the combined correlation image may be filtered e.g. by applying a low-pass filter to remove false peaks prior to determining a pixel representing the highest correlation. The first and the second correlation image and/or the combined correlation image may be interpolated to make it possible to determine a more precise estimate of a displacement between the first and the second image.

In some embodiments, the correlation images are processed together by creating a two dimensional histogram image over the location/index of the pixel in the correlation images representing the highest correlation.

The histogram image may be generated by, for each correlation image identifying the index of the pixel representing the highest correlation value, and increasing the value of the pixel having the same index in the histogram with 1, where the histogram image has the same size as the correlation images, and is initialized with equal values on all pixels e.g. the histogram image may be initialized to only contain pixels having the value zero. The displacement between the first and the second image may be determined by identifying the pixel in the histogram image having the highest value. The index of the pixel corresponds to a specific displacement. Alternatively the displacement may be determined as a weighted average of a number of index values of the pixels in the histogram image in proximity of the pixel representing the highest correlation. The weight may be influenced by the value of the pixels in proximity of the pixel representing the highest correlation. The method may examine the histogram to determine if enough data is present to determine a valid displacement between the first and the second image. The method may examine the histogram by checking if the pixel in the histogram having the highest value, has a value above a predetermined threshold. If the method determines that the highest value in the histogram is below a predetermined threshold, it may select and process more sub images.

The first and the second image may be bi-level (1 bit), black and white (grayscale) images or colour images. If the first and the second image are colour images, a single colour channel may be used to perform the correlations e.g. the green colour channel, alternatively all colour channels may be used to perform the correlations.

In some embodiments, a plurality of displacements between the first and the second image is determined by processing a plurality of correlation images.

Each displacement may be determined for a part of the first and the second image e.g. a first displacement may be determined for the top of the first and the second image, and a second displacement may be determined for the bottom of the first and the second image. A plurality of different displacements may be used to combine the first and the second image into a third image.

In some embodiments, a displacement between the first and the second image is determined, simultaneously with a medium is being scanned.

Consequently, a scanner may be calibrated online, enabling displacements between the first and the second image to be continuously determined.

In some embodiments, the method further comprises the step of examining the sub images to determine if they are suitable for correlation and if the method determines that the sub images are unsuitable for correlating a new set of sub images is selected at a new position in the first and the second image.

The method may examine the sub images by examining the frequency content of the sub images. Sub images with a high frequency content are generally more suitable for correlation algorithms. The frequency content may be determined by calculating a discrete Fourier transformation or simply by calculating a difference between the pixel in the sub image having the highest and lowest pixel value. A high difference will be indicative of high frequency content and as such a good correlation performance, and correspondingly a low difference will be indicative of a low frequency content and as such a low correlation performance.

In some embodiments the method further comprises the step of examining a correlation image to determine if the correlation image is valid, and if the method determines that the correlation image is invalid, the correlation image is not used to determine a displacement between the first and the second image.

The method may examine a correlation image by checking if the pixel representing the maximum correlation value has a correlation above a predetermined threshold and/or other pixels in the image have a correlation value relative to the maximum value, below another predetermined threshold. The thresholds may be dependent on the type of documents being scanned, the size of the sub images, or the type of correlation algorithm used.

The method may further examine a correlation image by examining the pixels in proximity of the pixel representing the maximum correlation value, to determine if the neighbour pixels have correlation values that are comparable to the correlation value of the pixel representing the maximum correlation e.g. within +−80%, +−50% or +−25% of the value of the pixel representing the maximum correlation (the sign in front of the percentages is determined by the type of correlation algorithm used, for some algorithms a high value correspond to a high correlation e.g. two dimensional cross correlation, and for some algorithms a low value corresponds to a high correlation e.g. sum of squared differences). As an example, at least the 2, 4, 8, or 24 nearest neighbours of the pixel representing the maximum correlation may be examined to determine if their correlation values are within a predetermined range from the value of the pixel representing the maximum correlation value e.g. within +−80%, +−50% or +−25% of the value of the pixel representing the maximum correlation. By examining the pixels in proximity of the pixel representing the maximum correlation, false peaks may be determined, as true peaks typically are surrounded by pixels representing a high correlation.

When using a scanner that has been idle for a period of time, previously determined displacements between the images may not be usable.

In some embodiments, the first and the second image is combined to form a third image by selecting a part of the first image to be combined with a part of the second image by using the determined displacement between the first and the second image.

The first and/or the second image may be re-sampled dependent on the determined displacement, so that the third image may have a predetermined size.

Consequently, the determined displacements values may be used in real time, allowing smooth artefacts free images to be created, without prior time consuming calibration procedures.

As the method uses a plurality of sub images from both the first image and the second image to determine a displacement between the first and the second image, a plurality of different displacements between the first and the second image may be determined e.g. a first displacement in the top of the first and the second image and second displacement in the bottom of the first and the second image. Using a plurality of different displacements to combine the first and the second image might however create visible artefacts when having to stretch or shrink the first and/or second image to comply with the varying displacements.

In some embodiments, the first and the second image comprise image data from a whole scanned medium such as a document, and wherein a single displacement is determined between the first and the second image.

Consequently, a simple method is provided that can compensate for the most visual problematic inaccuracies between the image sensors, without inducing new artefacts that would require computational expensive corrective processes.

The single displacement may be an average of the displacements determined between the individual sub images, a weighted average, or a displacement determined by examining a combined correlation image resulting from an addition of the individual correlation images.

The computational requirements for performing correlations may be significant. This will make the time required to scan a document and/or the cost of the equipment increase.

In some embodiments a guess of the displacement between the first and the second image is used to select the second sub image, so that the central part of the second sub image comprises image data from the same part of the scanned medium as the central part of the first sub image, if the guess is correct.

By using a guess when selecting the second sub image, and potentially also further sub images e.g. so that the central part of the fourth sub image comprises image data from the same part of the scanned medium as the central part of the third sub image, if the guess is correct, smaller sub images may be used. This will allow the computations to be simpler decreasing the cost of the equipment and may increase the scan speed.

According to a second aspect there is provided a calibrating method for a large format scanner comprising a first and a second image sensor, where a physical displacement between the first and the second image sensor is estimated by determining a displacement between a first image provided by the first image sensor and a second image provided by the second image sensor using a method as described above.

In some embodiments, the large format scanner is only recalibrated if the estimated change in the displacement between the first and the second image is above a predetermined threshold.

The predetermined threshold may be influenced by the optical resolution of the scanned images, the type of image sensors used, and the precision of the method described above.

According to a third aspect there is provided an apparatus for scanning comprising a first and a second image sensor where said first image sensor provides a first image, and said second image sensor provides a second image, said first and second images being two-dimensional images wherein said first and second images are recorded at respective areas of a scanned medium, where a portion of the respective areas is recorded also by the other of the respective image sensors, whereby image data from overlapping and non-overlapping areas are present in the first and the second image the apparatus further comprising a processing unit configured to:

correlating said first image with said second image creating a correlation image and processing said correlation image to determine a displacement between said first and second images.

All components of the apparatus may be integrated in a single integral unit, e.g. in an optical scanner, or the different parts of the apparatus may be implemented in different components; e.g. the image sensors may be implemented in a first component and the processing unit may be implemented a second component, e.g. in a PC connected to the first component with data communication means or in a server connected to the internet communicating directly or indirectly with the first component using data communication means.

Here and in the following, the terms 'processing means' and 'processing unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The different aspects of the present invention can be implemented in different ways including the methods of processing signals, calibration methods, and apparatuses described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependent claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein.

DETAILED DESCRIPTION

In the following description, reference is made to the accompanying figures, which show, by way of illustration, how the invention may be practiced.

Figure 1A:
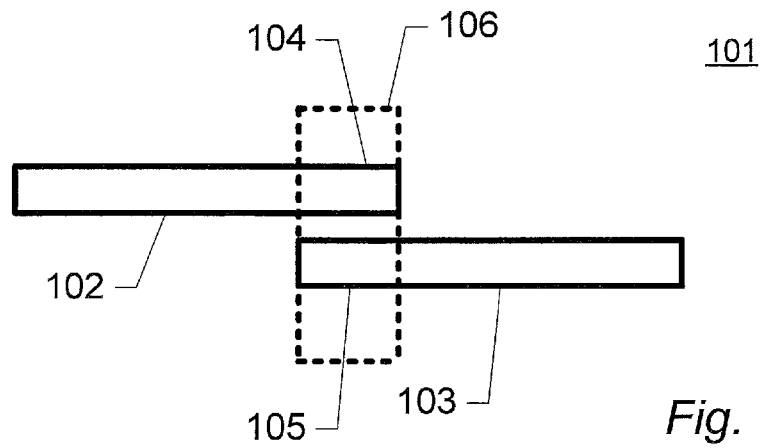
FIG. 1*a* shows two image sensors arranged with an overlapping area according to an embodiment of the present invention.

FIG. 1*a* shows two image sensors 102 103 arranged with an overlapping region 104 105 according to an embodiment of the present invention. The image sensors 102 103 may be CIS image sensors. The image sensors 102 103 may be arranged on a movable member, moving the image sensors past a medium to be scanned, and/or the medium may be moved past the image sensors using suitable means, e.g. motor operated rolls pulling the physical medium past the image sensors, such that a complete image of the physical medium can be generated. The image sensors 102 103 are arranged such that a portion of the area recorded of a scanned medium by one image sensor is also recorded by another image sensor; e.g. the region 104 of image sensor 102 records the same area as the region 105 of image sensor 103 just at another point in time; e.g. when the image sensors or the medium has been moved. Alternatively, if the image sensors are CCD cameras, the image sensors may be arranged on a single line recording the same area of a scanned medium at the same time.

Figure 1B:
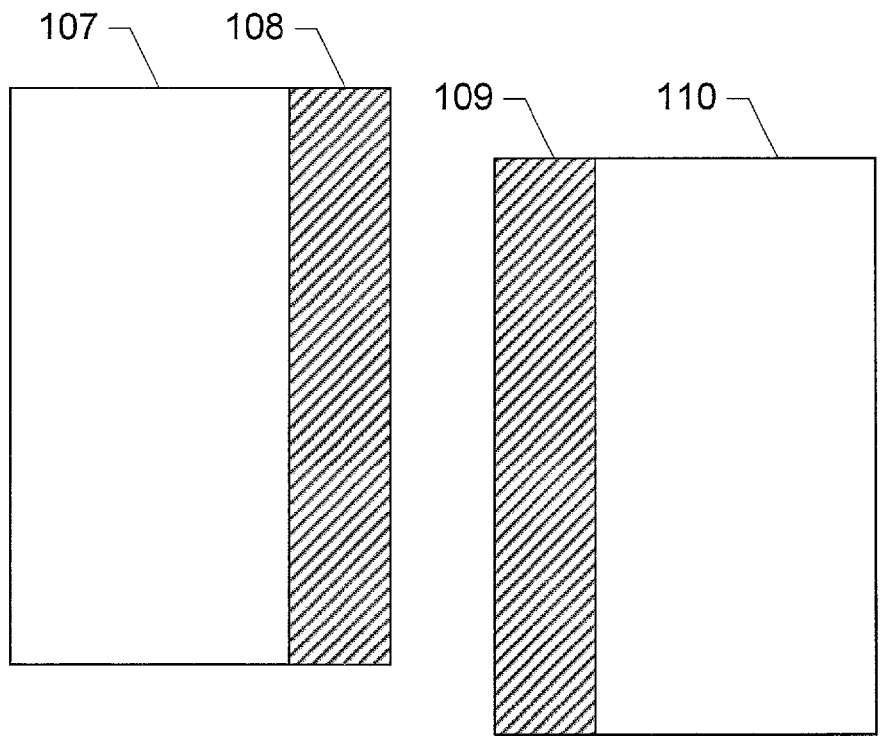
FIG. 1*b* shows a first and a second image recorded by the image sensors shown in FIG. 1*a* according to an embodiment of the present invention.

FIG. 1*b* shows two images recorded by two image sensors according to an embodiment of the present invention. The first image 107 may be recorded by the image sensor 102 shown in FIG. 1*a* and the second image 110 may be recorded by the image sensor 103 in FIG. 1*a*. Each of the first and the second image 107 110 comprises image data from an overlapping area 108 109 e.g. recorded by region 104 105 of image sensor 102 103, respectively.

Figure 1C:
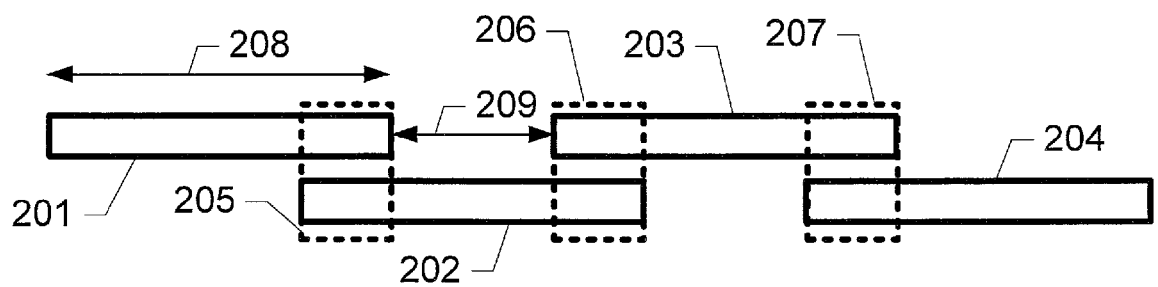
FIG. 1*c* shows four image sensors arranged with an overlapping area according to an embodiment of the present invention.

FIG. 1*c* shows four image sensors 201 202 203 204 arranged with overlapping areas 205 206 207 according to an embodiment of the present invention. The image sensors 201 202 203 204 may be CIS image sensors. The image sensors 201 202 203 204 may be arranged on a movable member, moving the image sensors past a medium to be scanned, and/or the medium may be moved past the image sensors using suitable means, e.g. motor-operated rolls pulling the physical medium past the image sensors, such that a complete image of the physical medium can be generated. The image sensors are arranged on two parallel lines, where every other image sensor 201 203 are arranged with a field of view on a first line and the image sensors in-between 202 204 are arranged with a field of view on a second line, where the distance between the field of view of two adjacent image sensors on a line 209 is below the width of the field of view of the image sensors 208, such that an area of a scanned medium recorded by an image sensor on the first line is also recorded by an image sensor on the second line 205 206 207, at a different point in time; e.g. when the image sensors and/or the physical medium have/has been moved.

Figure 2A:
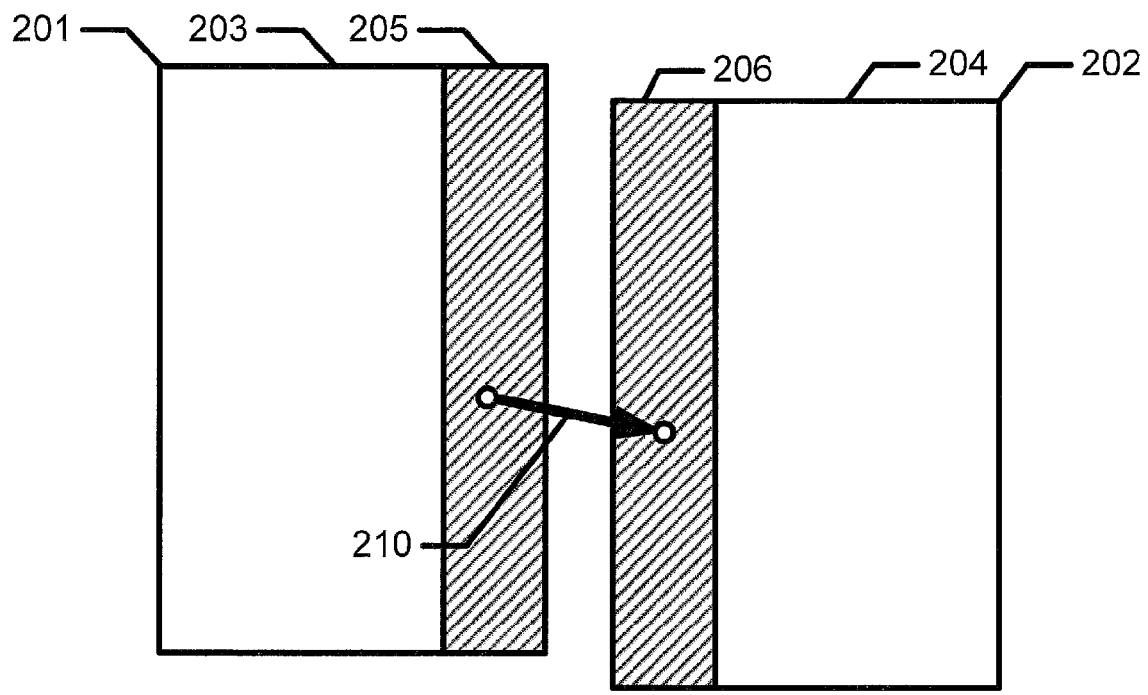
FIG. 2*a-b* show a method of determining a displacement between a first and a second image according to an embodiment of the present invention.
Figure 2B:
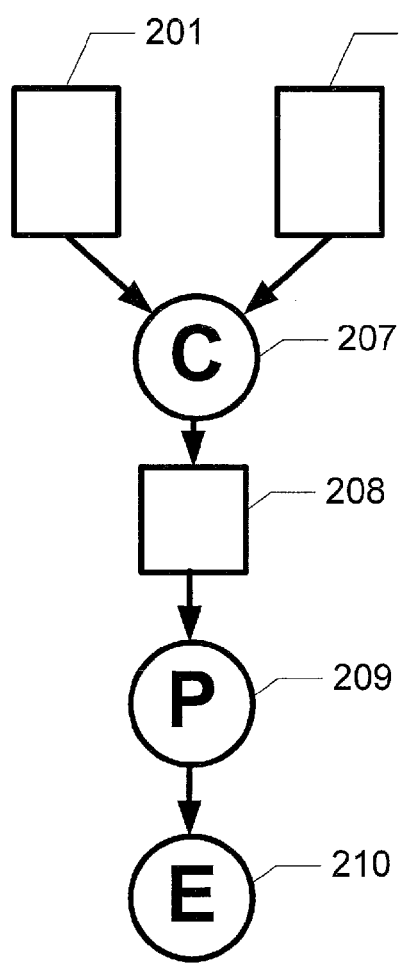

FIG. 2 shows a method of processing image signals from a first and a second image sensor of a large format scanner according to an embodiment of the present invention. FIG. 2a shows a first image 201 recorded by the first image sensor and a second image 202 recorded by the second image sensor. The first and the second image sensor may be arranged as shown in FIG. 1a. The first and the second image 201 202 comprises image data from overlapping areas 205 206 and non-overlapping areas 203 204. FIG. 2b illustrates how the method works. The first and the second image 201 202 are correlated 207 using a suitable correlation algorithm, such as the two dimensional cross-correlation, a sum of absolute difference operator, or a sum of squared difference operator, thereby creating a correlation image 208. The correlation algorithm displace the sub images relative to each other and perform a correlation examination e.g. by multiplying and summing (cross-correlation), subtracting, taking the absolute, and summing (sum of absolute difference), or subtracting, squaring, and summing (sum of squared difference). By examining the correlation between the sub images with all possible relative displacements, a correlation image can be generated that is representative of the correlation between the correlation images at different relative displacements. Each pixel in the correlation image represents the correlation of the sub images at a given relative displacement. The correlation image is processed 209 by a suitable algorithm to determine an estimate 210 of a displacement between the first and the second image 201 202. The correlation image 208 may be processed by determining the pixel representing the highest correlation. The index of the pixel will correspond to a relative displacement between the first and the second image 401 403, so by determining the index of the pixel representing the highest correlation, an estimate of a displacement 210 between the first and the second image 201 202 can be determined.

Figure 3A:
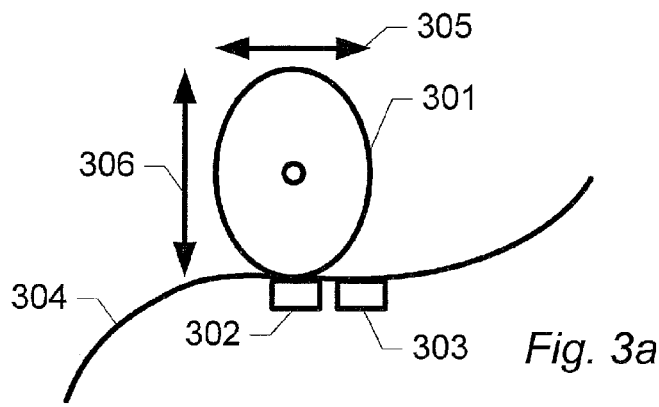
FIGS. 3*a-c* illustrate the problem with de-correlation of images recorded with different image sensors.

FIG. 3a shows a side view of a large format scanner comprising a motor operated roll 301 pulling a physical medium 304 to be scanned past two image sensors 302 303. The image sensors 302 303 may be arranged as shown in FIG. 1a. The roll is not perfectly round as the dimension 306 of the roll is slightly larger than the dimension 305.

Figure 3B:
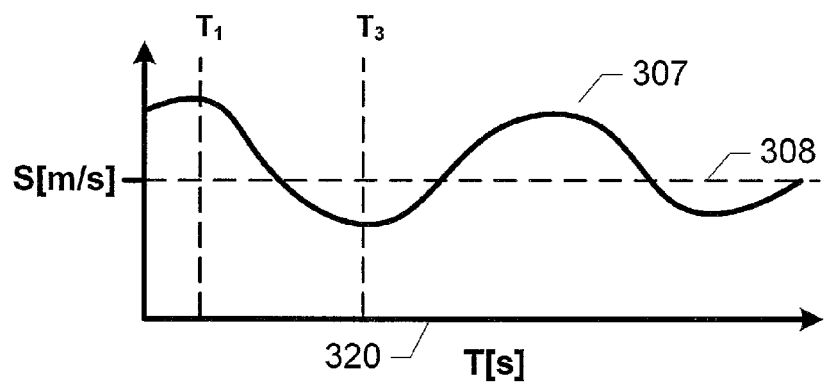

FIG. 3b shows a graph of the speed of the physical medium 304 pulled by the roll 301. The speed of the physical medium 307 varies around an average speed 308. The variations may be a result of the geometric imperfections of the roll and/or variation in the motor speed of the motor, operating the roll. Shown is two time instances $T_1$ and $T_3$, where the speed of the physical medium is highest and lowest, respectively.

Figure 3C:
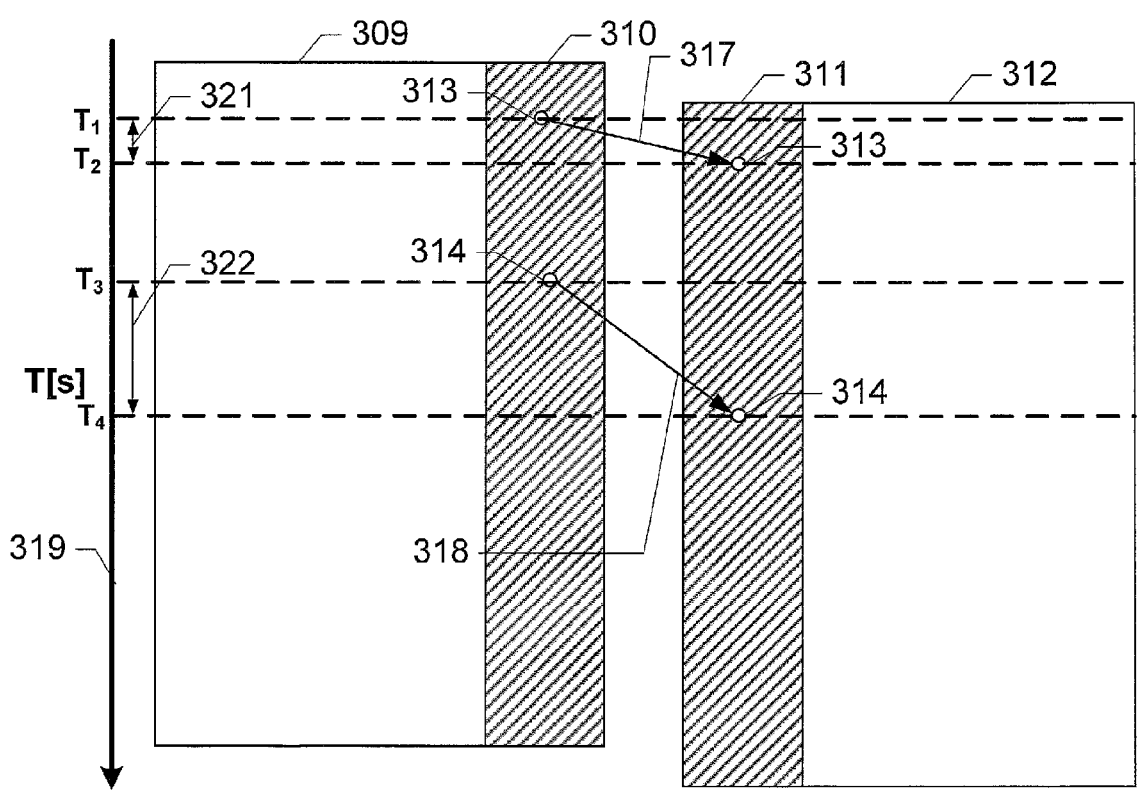
Figure 4A:
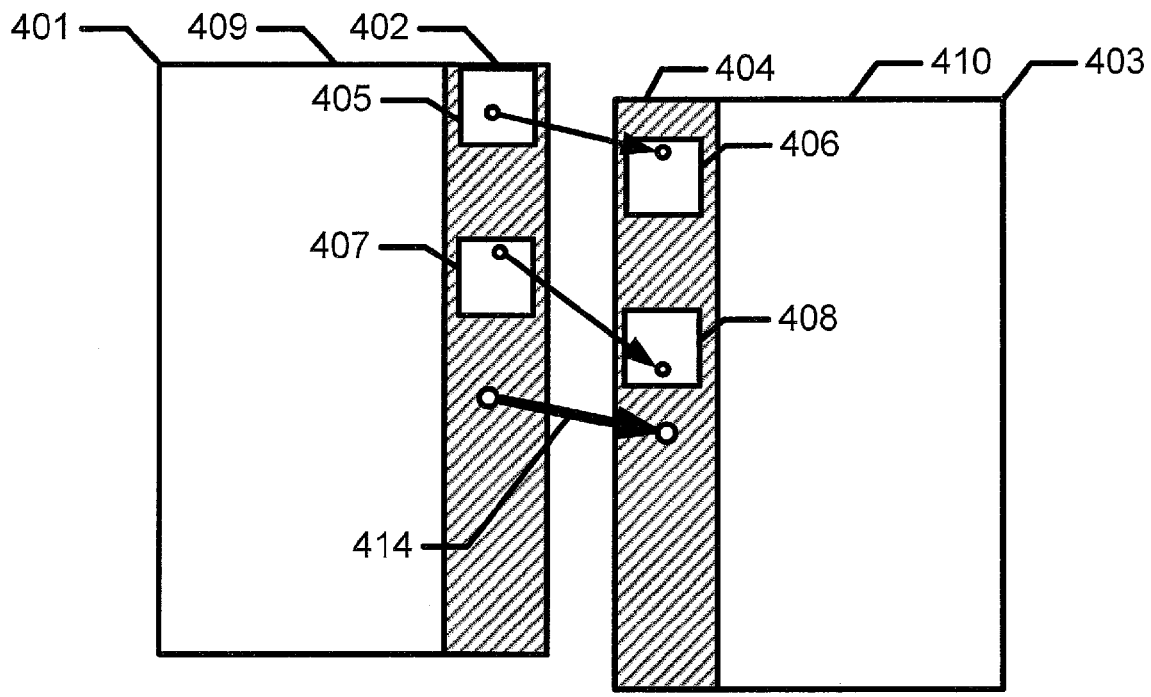
FIGS. 4*a-b* show a method of determining a displacement between a first and a second image according to an embodiment of the present invention.
Figure 4B:
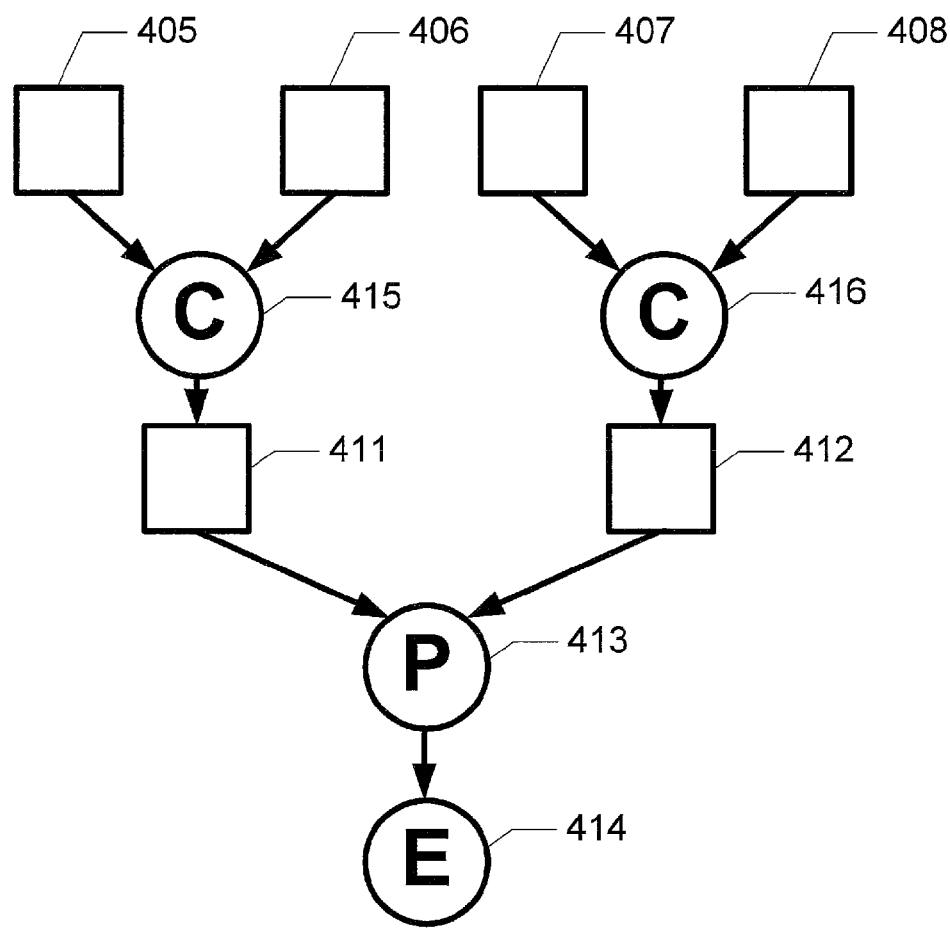

FIG. 3c shows a first image 309 and second image 312. The first image 309 is recorded by the image sensor 302 and the second image 312 is recorded by the image sensor 303 shown in FIG. 3a. The first and the second image 309 312 are scanned images of the physical medium 304 e.g. the first image 309 is a scanned image of the left part of the physical medium 304 and the second image 312 is a scanned image of the right part of the physical medium 304. Each of the first and the second image 309 312 comprises image data from an overlapping area 310 311 resulting from the same area of the scanned medium 304. Shown is also a time axis 319 corresponding to the time axis 320 shown in FIG. 3b. The time axis 319 shows at which point in time the different part of the first and the second image 309 312 is recorded. Shown is also the same two time instances $T_1$ and $T_3$ as shown in FIG. 3b. The second image 312 is moved a bit further down the time axis 319 compared to the first image 309 as the image sensor 302 recording the first image 309 is positioned in front of the image sensor 303 recording the second image 312. The first image comprises a first feature 313 and a second feature 314 recorded by image sensor 302 at points in time $T_1$ and $T_3$, respectively. The features 313 314 are positioned in the overlapping area 310 of the first image 309 and as a result are therefore also present in the overlapping area 311 of the second image 312 at point in time $T_2, T_4$. The first feature 313 is recorded by image sensor 302 at a point in time $T_1$ where the speed of the physical medium is high, as shown in FIG. 3b. The first feature will therefore be present in the second image with a "small" time lack 321. The second feature 314 is recorded by the first image sensor 302 at point in time $T_3$, where the speed of the physical medium is low, as shown in FIG. 3b. The second feature will therefore be present in the second image 312 with a larger time lack 322 compared to the time lack 321. The differences in time lack will result in a de-correlation between the first and the second image 309 312, decreasing the precision of correlation algorithms. This will result in erroneous estimate of the displacement between the first and the second image 309 312, with the effect that the scanner will be miscalibrated. This will create artefacts in the scanned images. FIGS. 4a-c illustrates how this problem may be overcome.

FIGS. 4a-b illustrate a method of processing image signals from a first and a second image sensor of a large-format scanner according to an embodiment of the present invention. FIG. 4a shows a first image 401 and second image 403 recorded by two image sensors. The first and the second image 401 403 comprises image data from overlapping areas 402 404 and non-overlapping areas 409 410. Shown is also a first sub image 405 positioned in the overlapping area 402, a second sub image 406 positioned in the overlapping area 404, a third sub image 407 positioned in the overlapping area 402, and a fourth sub image 408 positioned in the overlapping area 404. FIG. 4b shows how the method works. The first and the second sub image 405 406 and the third and fourth sub image 407 408 are correlated 415 416 using a suitable correlation algorithm, such as the two dimensional cross-correlation, a sum of absolute difference operator, or a sum of squared difference operator. The correlation algorithm displace the sub images relative to each other and perform a correlation examination e.g. by multiplying and summing (cross-correlation), subtracting, taking the absolute, and summing (sum of absolute difference), or subtracting, squaring, and summing (sum of squared difference). By examining the correlation between the sub images with all possible relative displacements, a correlation image can be generated that is representative of the correlation between the correlation images at different relative displacements. Each pixel in the correlation image represents the correlation of the sub images at a given relative displacement. The correlation algorithm generated a first and a second correlation image 411 412. The first and the second correlation image are processed together 413 by a suitable algorithm to determine an estimate 414 of a displacement between the first and the second image 401 403. The first and the second correlation image 411 412 may be processed together by adding them, creating a combined correlation image and determining the pixel of the combined correlation image representing the highest correlation. The index of the pixel will correspond to a relative displacement between the first and the second image 401 403, so by determining the index of the pixel representing the highest correlation, an estimate of a displacement 414 between the first and the second image 401 403 can be determined. Alternatively the first and the second correlation image 411 412 may be processed together by determining the index of the pixel in each of the first and the second correlation image 411 412 representing the highest correlation, and processing the indices together e.g. by creating a two dimensional histogram of indices when using more than 4 sub images e.g. 10, 20, 50 sub images. The estimate may then be the index of the two dimensional histogram having the highest value, or an average of the indices positioned around the index having the highest value.

By correlating small sub images the effect of the de-correlation between the first and the second image described in relation to FIGS. 3*a-c* is lowered. Thereby a more precise estimate of the true displacement between the first and the second image 401 403 can be determined making the calibration process of the scanner more precise.

Figure 5:
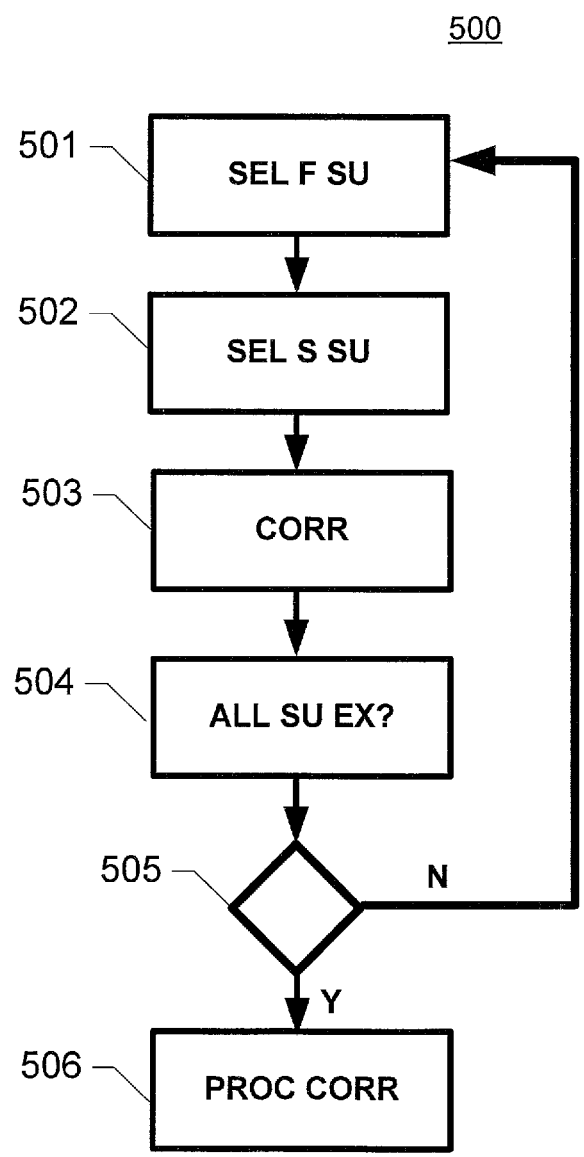
FIG. 5 shows a flowchart of a method of determining the relative position of the image sensors according to an embodiment of the invention.

FIG. 5 shows a flow chart of a method of processing signals from a first and a second image sensor where the first image sensor provides a first image and the second image sensor provides a second image according to an embodiment of the present invention. First, in step 501 a first sub image is selected from the first image. The first sub image is selected from a part of the first image comprising overlapping image data with the second image i.e. comprising image data from a part of a physical medium scanned by both the first and the second image sensor. Then, in step 502, a second sub image is selected from the second image. The second sub image is selected from a part of the second image comprising overlapping image data with the first image i.e. comprising image data from a part of a physical medium scanned by both the first and the second image sensor. In step 503, the first and the second sub image are correlated creating a first correlation image using a suitable correlation algorithm. In step 504 the method determines if a desired number of correlation images have been created. The desired number is at least two and possibly more e.g. 3, 5, 10, 20, 50 or more. If the method determines that the desired number of correlation images have not yet been reached, it returns to step 501 and selects two new sub images at different positions than any earlier selected sub images and correlates them creating a new correlation image. However, if the method determines that a desired number of correlation images have been created, it continues to step 506, where the created correlation images are processed together to determine a displacement between the first and the second image.

Figure 6:
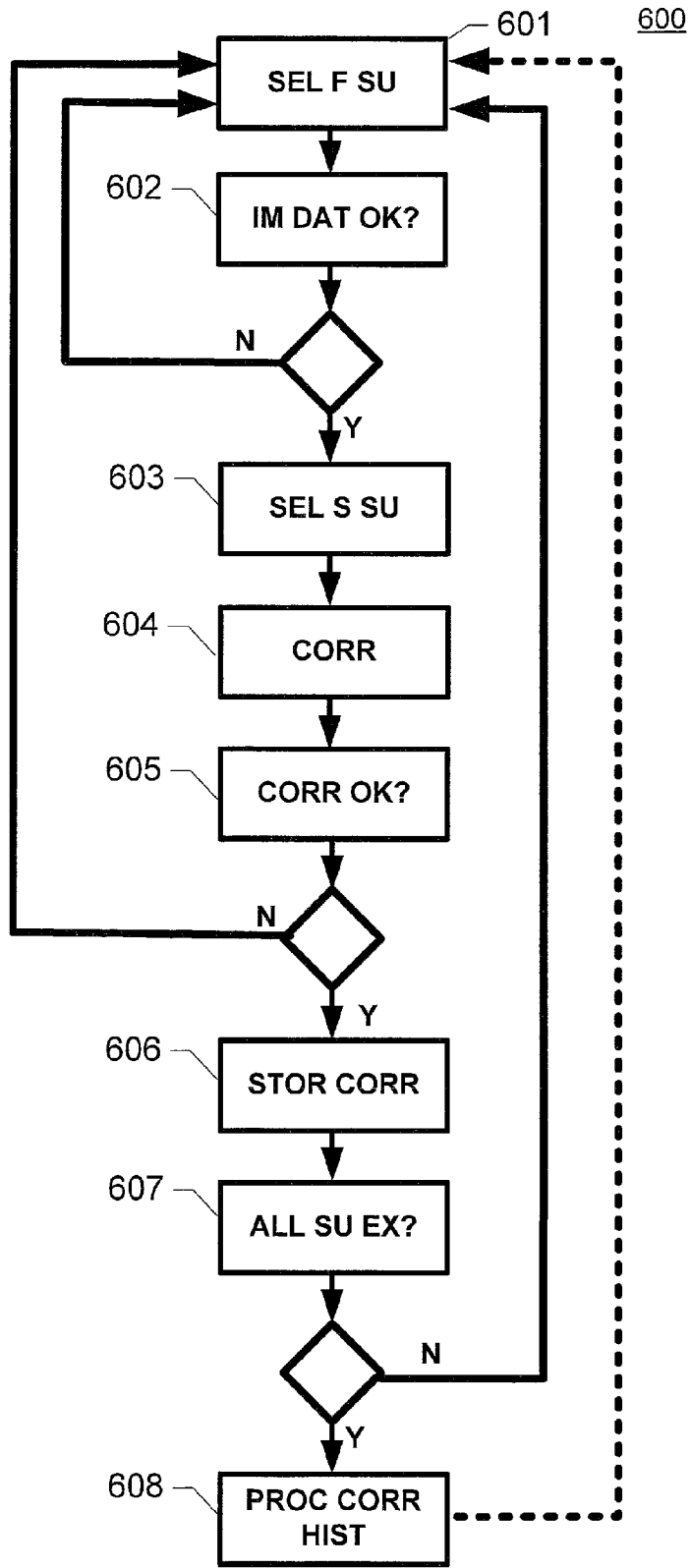
FIG. 6 shows a flowchart of a method of determining the relative position of the image sensors according to an embodiment of the invention.

FIG. 6 shows a flow chart of a method of processing signals from a first and a second image sensor where the first image sensor provides a first image and the second image sensor provides a second image, according to an embodiment of the present invention. First, in step 601, a first sub image is selected. The first sub image is selected from a part of the first image comprising overlapping image data with the second image i.e. comprising image data from a part of a physical medium scanned by both the first and the second image sensor. Then, in step 602, the method performs a check, to determine if the image data in the first sub image is suitable for input to a correlation algorithm. The method may perform the check by examining the frequency content of the sub image. If the method determines that the sub image is unsuitable for correlation, it returns to step 601 and selects a new sub image. If the method, however, determines that the sub image is suitable for correlation, it continues to step 603, where a second sub image is selected. The second sub image is selected from a part of the second image comprising overlapping image data with the first image i.e. comprising image data from a part of a physical medium scanned by both the first and the second image sensor. In step 604, the method correlates the first and the second sub image creating a first correlation image. Then in step 605, the method determines if the correlation image is valid. If the method determines that the correlation image is invalid, it returns to step 601 and selects a new sub image. If, however, the method determines that the correlation image is valid, it continues to step 606, where the correlation image is stored. In step 607 the method checks if a desired number of correlation images has been created. The desired number may be any number e.g. a predetermined number or a number dependent on the size of the scanned object. If the method determines that the desired number has not yet been reached, it returns to step 601 and selects a new set of sub images and processes them as described above creating a new correlation image. If, however, the method determines that the desired number has been reached, it continues to step 608 where the stored correlation images are processed to determine a displacement between the first and the second image. The method may process the correlation images by creating a two dimensional histogram image over the location/index of the pixel in the correlation images representing the highest correlation. The histogram image may be generated by, for each correlation image identifying the index of the pixel representing the highest correlation value, and increasing the value of the pixel having the same index in the histogram with 1, where the histogram image has the same size as the correlation images, and is initialized with equal values on all pixels e.g. the histogram image may be initialized to only contain pixels having the value zero. The displacement between the first and the second image may be determined by identifying the pixel in the histogram image having the highest value. The index of the pixel corresponds to a specific displacement. Alternatively the displacement may be determined as a weighted average of a number of index values of the pixels in the histogram image in proximity of the pixel representing the highest correlation. The weight may be influenced by the value of the pixels in proximity of the pixel representing the highest correlation. The method may examine the histogram to determine if enough data is present to determine a valid displacement between the first and the second image. The method may examine the histogram by checking if the pixel in the histogram having the highest value, have a value above a predetermined threshold. If the method determines that the highest value in the histogram is below a predetermined threshold, it may return to step 601 to process more sub images.

Figure 7:
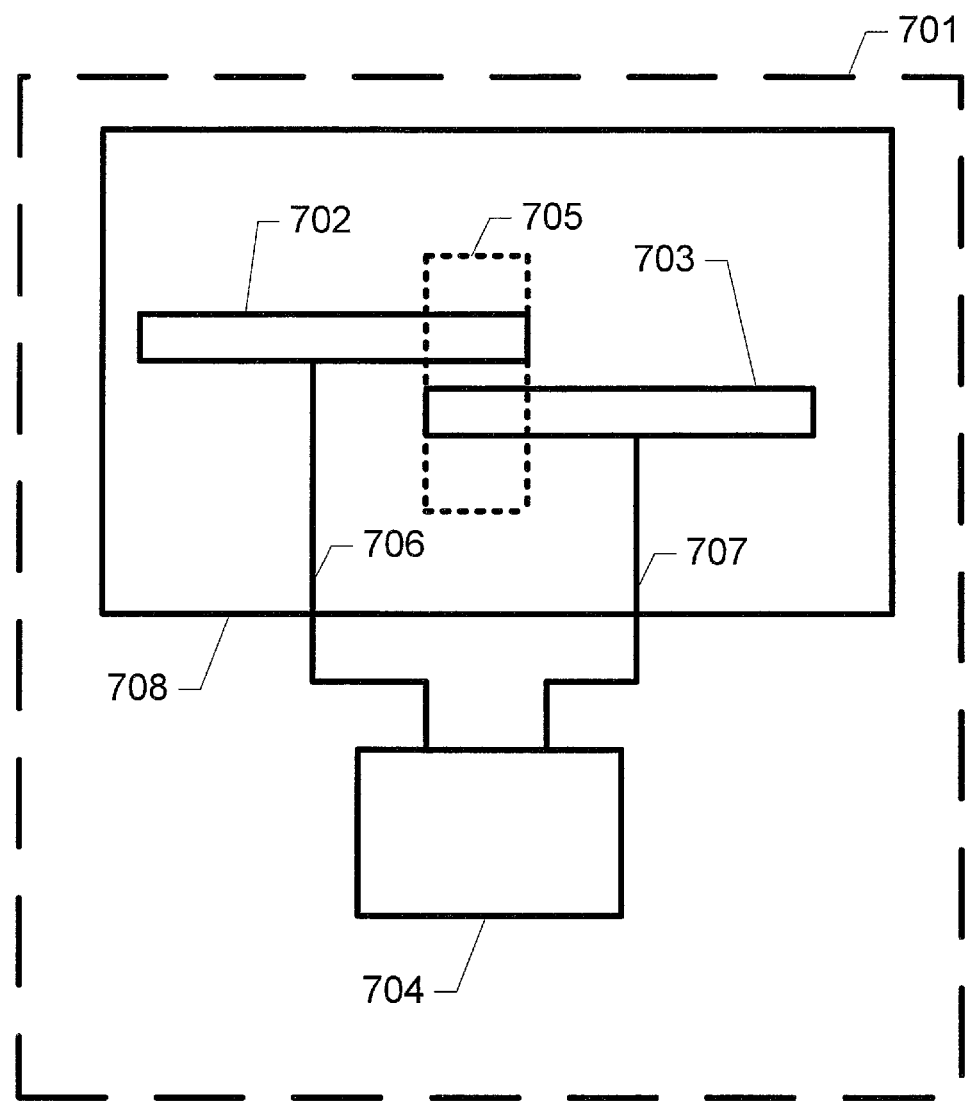
FIG. 7 shows a schematic drawing of an apparatus for scanning according to an embodiment of the present invention.

FIG. 7 shows a schematic drawing of an apparatus for scanning 701 according to an embodiment of the present invention. The apparatus comprises a first image sensor 702 and a second image sensor 703. The first image sensor 702 provides a first image, and the second image sensor 703 provides a second image, said first and second images being two-dimensional images wherein said first and second images are recorded at respective areas of a scanned medium, where a portion of the respective areas is recorded also by the other of the respective image sensors, whereby image data from overlapping 705 and non-overlapping areas are present in the first and the second image. The apparatus further comprises a processing unit 704 connected to the image sensors by data communication means 706 707. The processing unit 704 may process the images recorded by the image sensors 702 703 using the principles discussed above e.g. in relation to FIG. 2, 4, 5 and/or 6. All components of the apparatus 701 may be integrated in a single integral unit, e.g. in an optical scanner, or the different parts of the apparatus may be implemented in different components; e.g. the image sensors 702 703 may be implemented in a first component 708 and the processing unit may be implemented in a second component 704 e.g. in a personal computer (PC) connected to the first component 708 with data communication means 706 707 or in a server connected to the internet communicating directly or indirectly with the first component 708 using data communication means 706 707.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components, but does not preclude the presence or addition of one or more other features, integers, steps, components or groups thereof.

The invention claimed is:

1. A method of processing image signals from a first and a second image sensor arranged as staggered linear arrays along an x-direction, both of a document scanner unit, where said first image sensor provides a first image, and said second image sensor provides a second image, said first and second images being two-dimensional images wherein said first and second image are recorded at respective areas of a scanned document, where the document is scanned by relative movement in a y-direction between the image sensors and the document, and where a portion of each respective area is recorded by the staggered first and second image sensors, whereby image data from overlapping and non-overlapping areas are present in the first and the second image; the method comprising:

selecting a first two-dimensional sub image at a location in the overlapping area of the first image, and a second two-dimensional sub image at a location in the overlapping area of the second image, wherein the first and the second sub image both comprise image data from the same area of the scanned document;

correlating said first sub image with said second sub image, creating a first correlation image indicative of correlations at various displacements between said first and second sub images;

wherein the method further comprises repeating the above steps with sub images taken from different locations than the first and the second sub image, thus creating a second correlation image, and processing the first and second correlation image to determine first and second displacements between the sub-images of the first and the second image thereby registering time-varying relative displacements in the y-direction between scanning lines of the first and the second image sensors; and wherein the first and second displacements in the y-direction are used to combine the first and the second image into a third image by re-sampling one or both of the first and second image in at least the y-direction using the determined first and second displacements.

2. A method according to claim 1, where the first and the second image are combined to form a third image by selecting a part of the first image to be combined with a part of the second image by using the determined displacement between the first and the second image.

3. A method according to claim 1, where a guess of the displacement between the first and the second image is used to select the second sub image, so that the central part of the second sub image comprises image data from the same part of the scanned document as the central part of the first sub image, if the guess is correct.

4. A method according to claim 1, where the method further comprises the step of examining the sub images to determine if they are suitable for correlation and if the method determines that the sub images are unsuitable for correlation, a new set of sub images is selected at a new position in the first and the second image.

5. A method according to claim 1, where the method further comprises the step of examining a correlation image to determine if the correlation image is valid, and if the method determines that the correlation image is invalid, the correlation image is not used to determine a displacement between the first and the second image.

6. A method according to claim 5, where the correlation images are processed together by creating a two dimensional histogram image over the location/index of the pixel in the correlation images representing the highest correlation.

7. A calibrating method for a large format scanner comprising a first and a second image sensor, where a physical displacement between the first and the second image sensor is estimated by determining a displacement between a first image provided by the first image sensor and a second image provided by the second image sensor using a method according to claim 1.

8. A calibration method for a large format scanner according to claim 7, where the large format scanner is only recalibrated if the estimated change in the displacement between the first and the second image is above a predetermined threshold.

9. A data processing system having a non-transitory computer readable storage medium having stored thereon program code adapted to cause the data processing system to perform the steps of the method according to claim 1, when said program code is executed on the data processing system.

10. A non-transitory computer program product comprising program code adapted to cause a data processing system to perform the steps of the method according to claim 1, when said program code is executed on the data processing system.

11. A non-transitory computer program product according to claim 10, comprising a computer-readable medium having stored thereon the program code.

12. A non-transitory computer readable storage medium having stored thereon computer executable code which, when executed by a processor, causes the processor to perform the steps of the method according to claim 1.

13. An apparatus for scanning comprising a first and a second image sensor arranged as staggered linear arrays along an x-direction where said first image sensor provides a first image, and said second image sensor provides a second image, said first and second image being two-dimensional images wherein said first and second image are recorded at respective areas of a scanned document, where the document is scanned by relative movement in a y-direction between the image sensors and the document, and, where a portion of each respective area is recorded by the staggered first and second image sensors, whereby image data from overlapping and non-overlapping areas are present in the first and the second image, the apparatus further comprising a processing unit configured to perform the following steps:

select a first two-dimensional sub image at a location in the overlapping area of the first image, and a second two-dimensional sub image at a location in the overlapping area of the second image, wherein the first and the second sub image both comprise image data from the same area of the scanned document;

correlate said first sub image with said second sub image, creating a first correlation image indicative of correlations at various displacements between said first and second sub images; and repeat the above steps with sub images taken from different locations than the first and the second sub image, thus creating a second correlation image, and processing the first and second correlation image to determine first and second displacements between sub-images of the first and the second image thereby registering time-varying relative displacements in the y-direction between scanning lines of the first and the second image sensors, and wherein the first and second displacements in the y-direction are used to combine the first and the second image into a third image by re-sampling one or both of the first and second image in at least the y-direction using the determined first and second displacements.

* * * * *